(No Model.) 4 Sheets—Sheet 1.
A. H. SUTTON.
FABRIC MEASURING AND MARKING MACHINE.

No. 526,061. Patented Sept. 18, 1894.

Witnesses.
Frank Miller.
M. S. Ingham

Inventor.
Andrew H Sutton
By E. L. Thurston
his atty (No Model.) 4 Sheets—Sheet 2.
A. H. SUTTON.
FABRIC MEASURING AND MARKING MACHINE.
No. 526,061. Patented Sept. 18, 1894.

Witnesses.
Frank Meiller.
M. L. Ingham

Inventor.
Andrew H Sutton
By E. L. Thurston
his atty (No Model.) 4 Sheets—Sheet 3.

A. H. SUTTON.
FABRIC MEASURING AND MARKING MACHINE.

No. 526,061. Patented Sept. 18, 1894.

Witnesses.
Frank Miller.
M. S. Ingham

Inventor.
Andrew H. Sutton
By E. L. Thurston
his atty (No Model.) 4 Sheets—Sheet 4.

A. H. SUTTON.
FABRIC MEASURING AND MARKING MACHINE.

No. 526,061. Patented Sept. 18, 1894.

WITNESSES.
INVENTOR.

UNITED STATES PATENT OFFICE.

ANDREW H. SUTTON, OF NEW YORK, N. Y., ASSIGNOR TO THE FABRIC MEASURING AND PACKAGING COMPANY, OF SAME PLACE.

FABRIC MEASURING AND MARKING MACHINE.

SPECIFICATION forming part of Letters Patent No. 526,061, dated September 18, 1894.

Application filed May 28, 1892. Serial No. 434,812. (No model.)

*To all whom it may concern:*

Be it known that I, ANDREW H. SUTTON, a citizen of the United States, residing at New York, in the county of New York and State of New York, have invented certain new and useful Improvements in Fabric Measuring and Marking Machines; and I do hereby declare the following to be a full, clear, and exact description of the invention, such as will enable others skilled in the art to which it appertains to make and use the same.

In machines for measuring fabrics and printing the measures thereon, it has been customary to provide a printing wheel so connected and operated in conjunction with the measuring mechanism, that the measurements, in yards and fractions thereof, are marked on the under side of the fabric near its edge. An example of this class of machines may be found in Letters Patent No. 359,368, granted to me March 15, 1887. In some cases, as where the proper kind of ink is not used, or where the inking mechanism is not properly adjusted, and the fabric is, after being so marked, immediately wound upon a roll, an impression of the marking is sometimes offset from the first impression on the face of the fabric, thereby damaging it.

The object of my invention is to provide means whereby the end only of a piece of goods is marked, thereby reducing to the minimum the danger of injuring the fabric in the manner above pointed out. This result, I secure by holding both the inker and the fabric away from the marking wheel or printer until all of the fabric except about a yard has passed the printer, when both the inking rolls and fabric are automatically moved against the marking type and the balance of the piece is marked. This result might be accomplished by holding either the inking rolls or the fabric away from the printer, but greater certainty of action is secured by holding both away.

Figure 1:
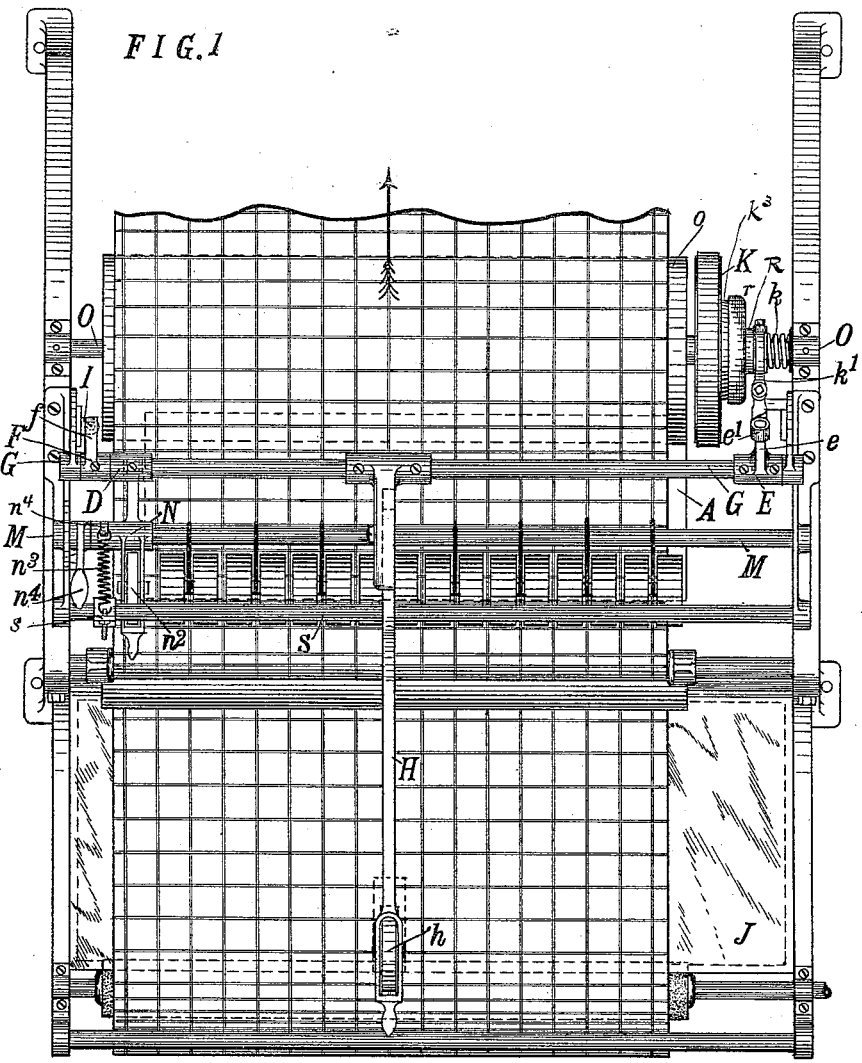
Figure 2:
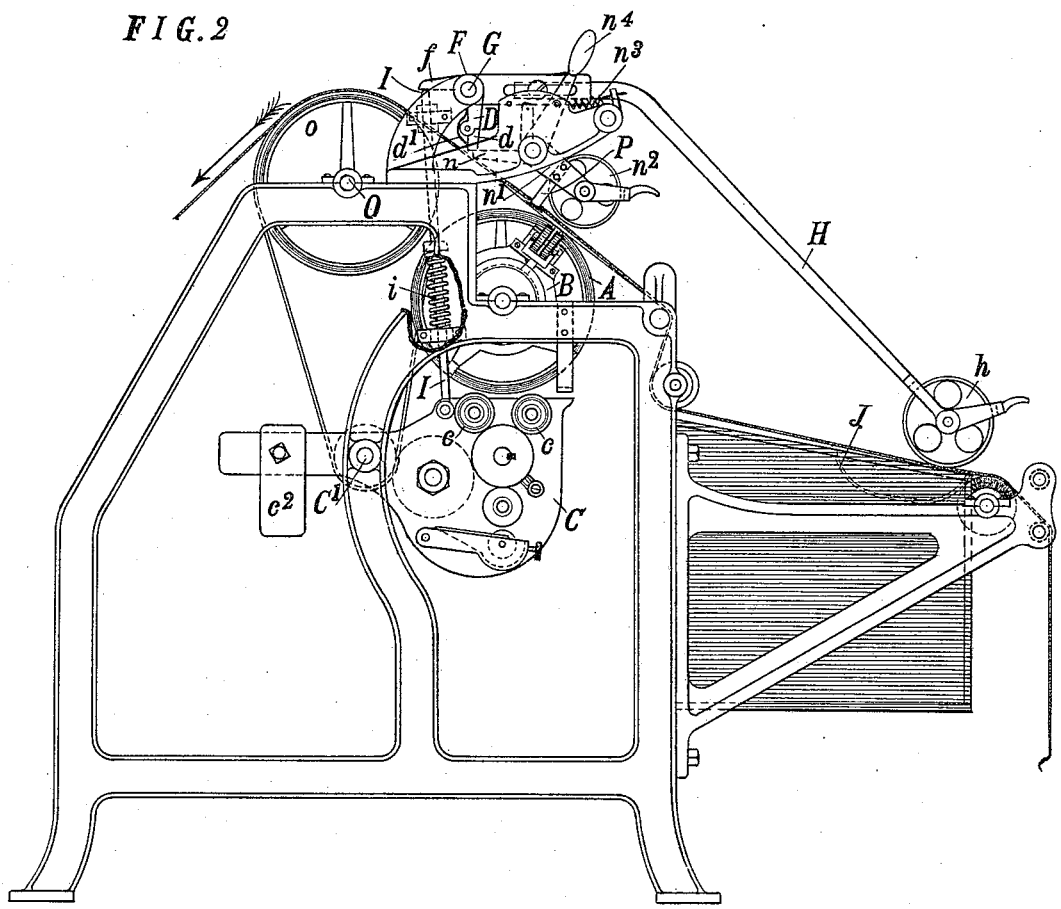
Figure 5:
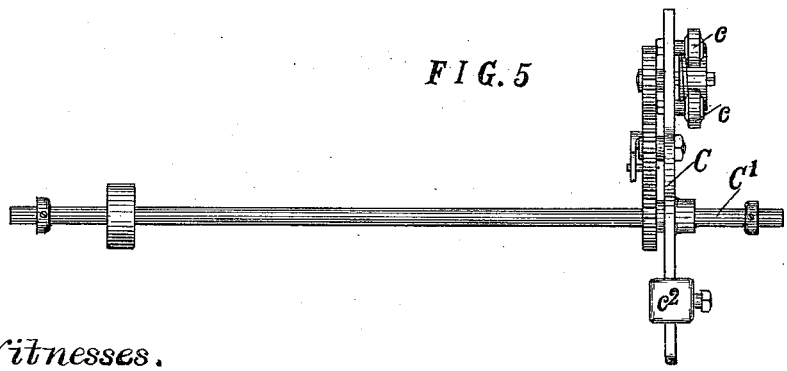
Figure 3:
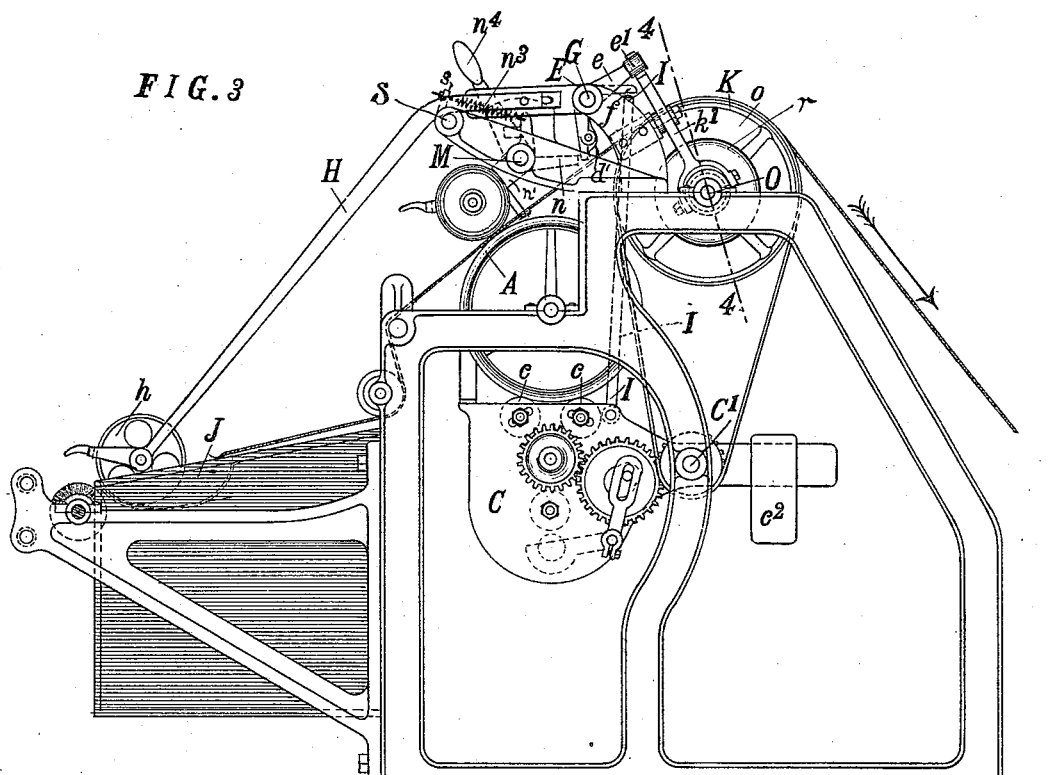
Figure 4:
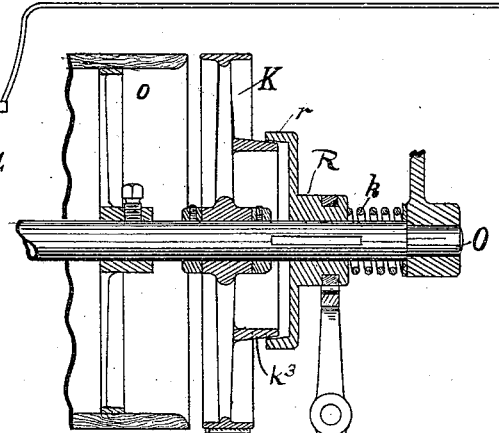
Figure 6:
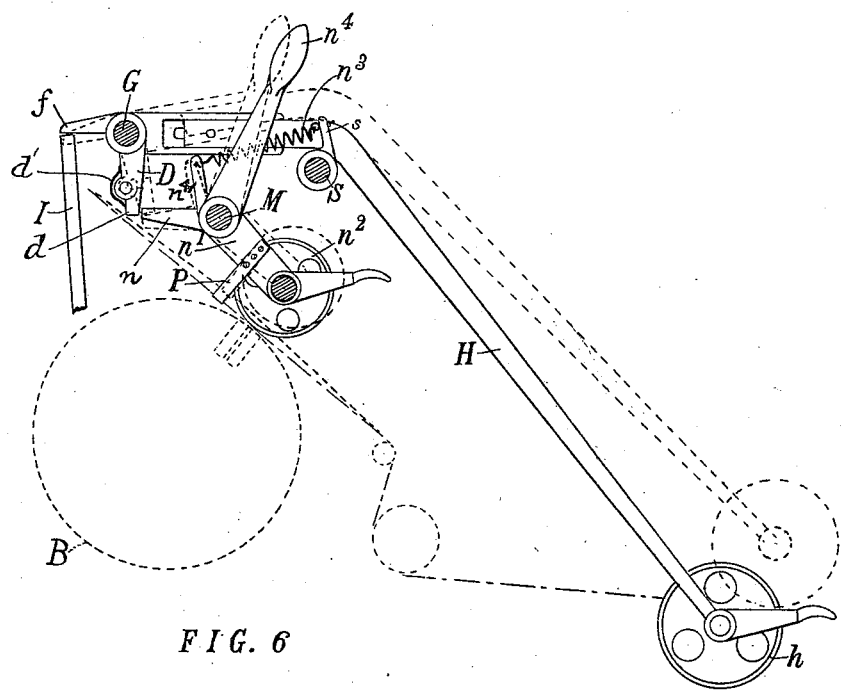

In the drawings, Figure 1 is a plan view of the machine through which a web of fabric is being drawn. Fig. 2 is a side elevation from the left of Fig. 1. Fig. 3 is a side elevation from the right of Fig. 1. Fig. 4 is a sectional view on line 4—4 of Fig. 2 of the clutch and its operating mechanism. Fig. 5 is a detached plan view of the mechanism for operating the inking rolls, and Fig. 6 is a vertical sectional view inside the frame and outside of sleeve N and spring $n^3$.

In Figs. 1 and 2 the parts of the machine are in such position that the fabric is not being marked. In Fig. 3 the parts are in such position that the fabric is being marked.

Referring to the parts by letters, A represents the measuring roll which is revolved by contact with the fabric, as the latter is drawn through the machine.

B represents the printing wheel or spider, of the well known construction, which is secured to the shaft of the measuring roll.

C represents the inker frame which is pivoted to the shaft $c'$, the shaft being journaled to the frame of the machine. The inker frame carries a receptacle for the ink and a series of rolls which are driven by a train of gears of which the first gear is secured to the shaft $c'$. The function of these rolls is to take up ink, spread it and transfer it to the inking rolls $c$ $c$ by which the type on the printing wheel B is supplied. This frame extends beyond its pivot and carries a weight $c^2$ which is adapted to substantially counterbalance the weight of the rollers, &c.

A rock shaft G is journaled in the side pieces of the machine frame. An arm H is secured to this rock shaft and extends forward and downward to a point just above a slot in the table J over which the fabric is drawn. To the end of this arm, a wheel $h$ is journaled, and, unless upheld, this wheel drops into the said slot thereby rocking the rock shaft G. The arm H is formed of two parts (one of which is slotted) which are connected by bolts, whereby the length of the arm may be adjusted. The upper part of the arm H is provided with a collar which is fastened to the shaft G by a set screw or screws. Similarly secured to the rock shaft G are three collars D, E and F. The collar F carries a lug $f$ which rests against the upper end of the substantially vertical rod I, the lower end of which is connected with the inker frame. The motion of the rock shaft in one direction causes the said lug to press down upon the rod I, thereby moving the inker away from the printing wheel. The motion of the rock shaft in the opposite direction permits a coiled spring $i$ (which surrounds the rod I and thrusts against a bracket on the frame and a collar $i'$ on the rod) to force the inker against the printing wheel. The collar D is provided with a downwardly projecting arm, consisting of two parts see Fig. 6 which are hinged together so as to allow the hinged part to work in one direction substantially like the hinge of a pocket rule. The lower part $d$ of this arm is adapted to engage with an arm $n$ which is attached to a sleeve N loosely mounted on the cross rod M. An arm $n'$ is likewise secured to said sleeve and carries on its end a pressure roller $n^2$ which is adapted to press the fabric against the printer. The sleeve is moved in the direction to cause the roller to press the fabric against the printer by a contractile coil spring $n^3$ (which is secured at one end to a fixed arm $s$ secured to one of the cross braces S of the machine, and at the other end to an arm $n^4$ secured to sleeve N). The hand lever $n^4$ affords means for lifting the pressure roll. When the pressure roll is lifted, the arm $n$ pushes back the lower part $d$ of the arm D until it passes said part, when a spring $d'$ moves the part $d$ back over said arm $n$ and holds up the roller $n^2$.

Attached to the arm $n'$ is an L-shaped finger P which engages beneath the edge of the fabric, and when the roller $n^2$ is moved upward this finger lifts the fabric from the printing wheel.

A roll $o$ is secured to the shaft O; and in the operation of the machine, the fabric is drawn along in contact with said roll, thereby revolving it and the shaft O. A pulley K is loosely mounted on said shaft, and a clutching device is provided for automatically connecting it to said shaft when desired. A belt transmits the motion of the pulley K to the shaft C', thereby causing the revolution of the inking roller.

The construction of the clutching device for connecting the pulley K to the shaft O, and the mechanism for automatically operating it are as follows: A collar R is mounted on the shaft O, and is connected thereto by a spline which permits its longitudinal movement. The collar carries an annular cylindrical flange $r$ having an inner cone surface, which is adapted to engage with an annular cone surface of a flange $k^3$ on the pulley K. The collar R is moved to cause the engagement of the clutching surfaces by a spring $k$ which surrounds shaft O and thrusts endwise against the frame of the machine and the end of the collar R. The said collar is moved in the opposite direction by a fork lever $k'$ which engages at one end in a groove in the collar R. The other end of said lever is beveled and an arm $e$, rigid with collar E carries a roller $e'$ on its end, which engages with the beveled end of lever $k'$ and operates it to cause the movement of collar R and the consequent release of the clutching surfaces.

When a piece of goods is passing through the machine, that part of the fabric which is passing over the table J is beneath the wheel $h$ and holds it out of the slot. In this position of the wheel, the rock shaft is held in such position that the clutching surfaces on the pulley K are held out of engagement with the co-acting clutching surface carried by the shaft O. Therefore the inking rolls are not revolving. The inker frame is held down so that the inker rolls do not engage with the printing wheel, and the pressure roller $n^2$ is upheld so that it does not press the goods against the printer, and at the same time the finger P holds the fabric above the printing wheel; but when the end of the fabric passes from under the wheel $h$, said wheel drops into the slot in the table thereby rocking the rock shaft G in such manner as before explained, that the fabric is pressed by the roller $n^2$ down onto the printer. The inker frame is raised by the spring $i$ so that the inker rolls supply ink to the printing wheel, and these inker rolls are caused to revolve by reason of the revolution of the pulley K which has been frictionally connected with the shaft O.

In a machine provided with the above described invention, only so much of the end of the web as will extend from the roll $n$ to the marking wheel will be marked; but the marking mechanism is constantly operated, as in other machines, wherefore the marks placed on the fabric will indicate the number of yards and fractions thereof in the piece.

Having thus described my invention, what I claim as new, and desire to secure by Letters Patent, is—

1. In a fabric measuring and marking machine, the combination of a printing wheel and a pivoted arm H adapted to rest upon and be upheld by the fabric at the front end of the machine, with mechanism adapted to prevent the printing wheel from making any marks upon the fabric, and suitable devices connecting said arm with said mechanism whereby the latter is rendered inoperative by the fall of the arm H when the fabric is drawn from beneath it, substantially as set forth.

2. In a fabric measuring and marking machine, the combination of a printing wheel, and a pivoted arm carrying a pressure roll adapted to press the fabric against the printer, with a rock shaft G, an arm H secured thereto and adapted to rest upon and be upheld by the fabric at the front end of the machine, and a latch carried by said rock shaft, and mechanism connected with said pressure roller and adapted to be engaged by said latch, whereby the pressure roll is upheld above said fabric substantially as and for the purpose specified.

3. In a fabric measuring and marking machine, the combination of a printing wheel, a pivoted sleeve N having the arms $n\,n'$, and a pressure roller carried by one of said arms, with a rock shaft G, an arm H secured thereto adapted to rest upon and be upheld by the fabric at the forward end of the machine, and a hinged latching arm secured to said rock shaft, substantially as set forth.

4. In a fabric measuring and marking machine, the combination of a printing wheel, a pivoted inker frame and inking rollers carried thereby, with a pivoted arm which extends toward the front of the machine to a point where its end rests upon and is upheld by the fabric which is being measured, and mechanism connecting said arm and inker frame whereby the latter is held away from the printing wheel when the arm is upheld as described but is permitted to move toward the printing wheel when said arm drops after the end of the fabric is drawn from under it, substantially as set forth.

5. In a fabric measuring and marking machine, the combination of a printing wheel, a pivoted inker frame and rollers carried thereby, with a rock shaft G, the arm H secured thereto and adapted to rest at the forward end of the machine on the fabric, a lug $f$ secured to the rock shaft, and the longitudinally movable rod I which extends between said lug and inker frame, substantially as and for the purpose specified.

6. In a fabric measuring and marking machine, the combination of a printing wheel, and a movable fabric lifting device, with a rock shaft G, an arm H secured thereto adapted to rest upon and be upheld by the fabric at the front end of the machine, and mechanism connecting said fabric lifting device with the rock shaft G, substantially as set forth.

7. In a fabric measuring and marking machine, the combination of a printing wheel, revolving inker rolls, a shaft C' for driving them, a revolving shaft O, a loose pulley carried thereby, a belt connecting the same with the driving shaft of the inking rolls, an automatic clutch for connecting said pulley with its shaft, and clutch releasing mechanism, with a rock shaft G, an arm H secured thereto adapted to rest upon and be upheld by the fabric at the front end of the machine, and suitable devices connecting said rock shaft with the clutch releasing mechanism, substantially as set forth.

8. In a fabric measuring and marking machine, the combination of a printing wheel, revolving inker rolls, a shaft C' for driving them, a revolving shaft O, a loose pulley carried thereby, a belt connecting the same with the driving shaft of the inking rolls, an automatic clutch for connecting said pulley with its shaft, and a lever for releasing said clutch having a beveled end, with a rock shaft G, an arm H secured thereto adapted to rest upon and be upheld by the fabric at the front end of the machine, and an arm secured to said rock shaft and a friction roller carried by said arm and engaging with the beveled end of said lever, substantially as set forth.

In testimony whereof I affix my signature in presence of two witnesses.

ANDREW H. SUTTON.

Witnesses:
ROBERT W. WATSON,
WM. WARDLE.